US012247419B2

(12) United States Patent
Aldersley et al.

(10) Patent No.: US 12,247,419 B2
(45) Date of Patent: Mar. 11, 2025

(54) CLOSING BRACKET OF A MOTOR VEHICLE BODY LOCK, MOTOR VEHICLE BODY LOCK COMPRISING A CLOSING BRACKET OF THIS KIND, AND CORRESPONDINGLY EQUIPPED MOTOR VEHICLE

(71) Applicant: Bayerische Motoren Werke Aktiengesellschaft, Munich (DE)

(72) Inventors: Nicholas Aldersley, Hebertshausen (DE); Michael Brandstaetter, Markt Schwaben (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 194 days.

(21) Appl. No.: 17/418,931

(22) PCT Filed: Dec. 4, 2019

(86) PCT No.: PCT/EP2019/083590
§ 371 (c)(1),
(2) Date: Jun. 28, 2021

(87) PCT Pub. No.: WO2020/156706
PCT Pub. Date: Aug. 6, 2020

(65) Prior Publication Data

US 2022/0065004 A1 Mar. 3, 2022

(30) Foreign Application Priority Data

Jan. 30, 2019 (DE) ..................... 10 2019 102 392.0

(51) Int. Cl.
*E05B 85/04* (2014.01)
*E05B 77/36* (2014.01)

(52) U.S. Cl.
CPC ............ *E05B 77/36* (2013.01); *E05B 85/045* (2013.01)

(58) Field of Classification Search
CPC .......... E05B 77/36; E05B 77/38; E05B 85/04; E05B 85/045; E05B 2015/03;
(Continued)

(56) References Cited

U.S. PATENT DOCUMENTS 4,225,166 A * 9/1980 Tanaka .................... E05B 83/16 292/DIG. 43
4,602,813 A 7/1986 Gergoe et al.
(Continued)

FOREIGN PATENT DOCUMENTS

CN 103109027 A 5/2013
CN 103814185 A 5/2014
(Continued)

OTHER PUBLICATIONS

English-translation of Chinese Office Action issued in Chinese Application No. 201980074134.9 dated Sep. 17, 2021 (five (5) pages).
(Continued)

*Primary Examiner* — Christine M Mills
*Assistant Examiner* — Noah Horowitz
(74) *Attorney, Agent, or Firm* — Crowell & Moring LLP

(57) ABSTRACT

A lock striker of a motor vehicle body lock includes a striker and at least one additional mass. The striker is arranged on a striker plate. The striker has a striker section which is configured to admit a load. The striker plate has a first striker plate section which is configured to be connected to a body component. The striker plate has a second striker plate section on which the striker is arranged. The first striker plate section and the second striker plate section are connected to one another. The first striker plate section and the
(Continued)

second striker plate section are spaced apart from one another so as to form a receiving space in which a damping means is situated. The at least one additional mass is arranged on the second striker plate section and/or on that region of the striker which is adjacent to said second striker plate section.

8 Claims, 1 Drawing Sheet

(58) Field of Classification Search
CPC ....... E05B 2015/0265; E05B 2015/027; E05B 15/022; E05B 15/0295
See application file for complete search history.

(56) References Cited

U.S. PATENT DOCUMENTS

| | | | | |
|---|---|---|---|---|
| 8,246,088 | B2 * | 8/2012 | Stechschulte | E05B 77/00 292/341.15 |
| 9,309,693 | B2 * | 4/2016 | Puscas | E05B 85/00 |
| 2014/0291999 | A1 | 10/2014 | Graute et al. | |
| 2020/0040622 | A1 * | 2/2020 | Digel | E05B 85/04 |
| 2021/0246687 | A1 * | 8/2021 | Digel | E05B 83/24 |
| 2021/0372174 | A1 * | 12/2021 | Aldersley | E05B 85/045 |
| 2022/0074240 | A1 * | 3/2022 | Aldersley | B62D 25/12 |

FOREIGN PATENT DOCUMENTS

| | | | | |
|---|---|---|---|---|
| DE | 197 32 365 | A1 | 2/1999 | |
| DE | 10 2006 002 972 | A1 | 8/2007 | |
| DE | 10 2013 013 937 | B3 | 2/2015 | |
| DE | 102016111749 | A1 * | 12/2017 | E05B 77/38 |
| EP | 0410864 | A1 * | 1/1991 | E05B 15/0245 |
| EP | 2290177 | A2 * | 3/2011 | E05B 15/0225 |
| KR | 96-5577 | Y1 | 7/1996 | |
| KR | 10-2011-0099371 | A | 9/2011 | |

OTHER PUBLICATIONS

International Search Report (PCT/ISA/210) issued in PCT Application No. PCT/EP2019/083590 dated Feb. 20, 2020 with English translation (four (4) pages).
German-language Written Opinion (PCT/ISA/237) issued in PCT Application No. PCT/EP2019/083590 dated Feb. 20, 2020 (five (5) pages).
German-language Search Report issued in German Application No. 10 2019 102 392.0 dated Dec. 13, 2019 with a partial English translation (14 pages).

* cited by examiner

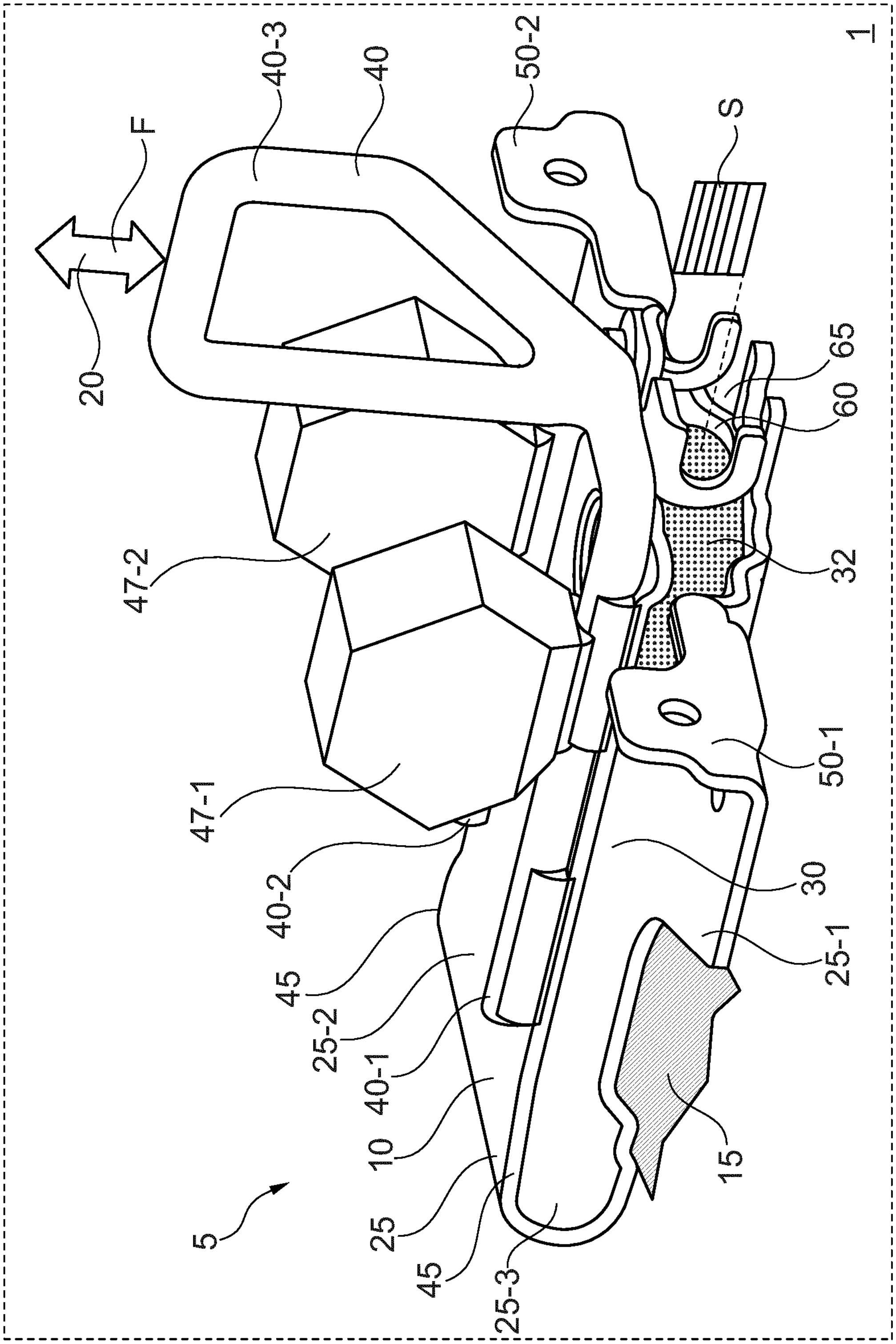
1
F
40-3
40
50-2
S
20
65
60
32
47-2
50-1
47-1
30
40-2
25-1
45
25-2
40-1
10
15
5
25
45
25-3

CLOSING BRACKET OF A MOTOR VEHICLE BODY LOCK, MOTOR VEHICLE BODY LOCK COMPRISING A CLOSING BRACKET OF THIS KIND, AND CORRESPONDINGLY EQUIPPED MOTOR VEHICLE

BACKGROUND AND SUMMARY OF THE INVENTION

The embodiments of the present invention relate to a lock striker for a motor vehicle body lock, to a motor vehicle body lock, which has a corresponding lock striker, and to a motor vehicle equipped therewith.

Lock strikers of motor vehicle body locks are used, in conjunction with corresponding hooks, for selectively releasing or closing in particular doors, front flaps or rear flaps. Here, on the one hand, moderate stiffness of the motor vehicle body lock in the closing direction thereof is sought, whereas, on the other hand, such moderate stiffness with respect to the relative transverse direction or vertical direction of said motor vehicle body lock is rather perceived as disadvantageous. To avoid disturbing noises and to compensate position tolerances of the stated parts, it is the case in motor vehicle body locks that lock strikers are equipped with elastic elements which act as vibratory decoupling means. In practice, during the opening of motor vehicle body locks, a disturbing bang however occurs because the elements that are connected to one another in the closed state of the motor vehicle body lock are abruptly relieved of stress. Altogether, the decoupling means disadvantageously also have no particular differentiation of the stiffness in the stated directions, such that, in the development of a motor vehicle body lock, there is always a conflict of aims between a limitation of a vibratory decoupling action and the direction- dependent locking function of the lock striker.

It is an object of the embodiments of the present invention to specify a lock striker of a motor vehicle body lock, in the case of which the stated disadvantages can be alleviated.

Said object is achieved by means of the inventive lock striker of a motor vehicle body lock disclosed herein. Advantageous configurations are also specified herein.

The lock striker according to the embodiments of the invention of a motor vehicle body lock has a striker arranged on a striker plate, which striker in turn has a striker section which admits a load. The expression “striker” encompasses both strikers of closed form and strikers of open form.

The load represents in particular forces and moments which can arise at the motor vehicle body lock according to the embodiments of the invention in one of the functional situations presented below, without deficient functioning thereof occurring:

In a first functional situation, defined as rest situation, the lock striker is subjected to substantially no load (that is to say when a correspondingly equipped motor vehicle body lock is open) or is subjected to only a low load (that is to say when the motor vehicle body lock, proceeding from its opened state, is closed in the intended manner or, proceeding from its closed state, is opened in the intended manner).

In a second functional situation, defined as operating position, a component which is closed by means of the lock striker, in particular a rear flap, is locked, and a correspondingly equipped motor vehicle is at a standstill or is in an intended driving state.

In a third functional situation, the motor vehicle body lock is subjected to a highly dynamic acceleration, which arises in particular during a highly dynamic closure of the motor vehicle body lock. This type of closure is caused by an improper movement, caused in particular by a person, of a component that engages into the motor vehicle body lock, such that this type of closure is sometimes also referred to as violent closure. Whereas a proper closing process involves a closing speed of up to approximately 1.4 m/s, the closing speed in the case of a violent closure is higher than this, and is higher than 1.9 m/s.

In a fourth functional situation, the motor vehicle body lock is subjected to an accident-induced highly dynamic acceleration in which the load factor is 30 g. The fourth functional situation may also be referred to as “crash situation”.

According to the embodiments of the invention, the lock striker or a correspondingly equipped motor vehicle body lock has a striker plate with a first striker plate section which is connected to a body component, in particular a hook situated on a front flap or on a rear flap, in one of the functional situations. The striker plate furthermore has a second striker plate section, on which the striker is situated. The first striker plate section and the second striker plate section are connected, preferably elastically, to one another. They may—optionally—form the limbs of a U or of a V. Between them, there is formed a receiving space in which a—preferably elastically preloaded—damping means is situated. The damping means preferably has a hardness of lower than or equal to 25 Shore A over a temperature range from substantially −30° C. up to substantially +80° C. It is pointed out that the damping means may be of single-part or multi-part form. Accordingly, it is in particular possible for the damping means to be formed from two or more different materials. Alternatively or in addition, at least one additional mass is arranged on the second striker plate section and/or on that region of the striker which is adjacent to said second striker plate section. Preferably, an additional mass amounts to more than 90 g, furthermore preferably more than substantially 100 g. In the case of two mutually spaced-apart additional masses provided according to the embodiments of the invention, the sum of the additional masses consequently preferably amounts to more than 200 g. At least one additional mass is particularly preferably arranged as close as possible to a motor vehicle body lock which interacts with the lock striker according to the embodiments of the invention, or as far as possible from the upper end of the striker.

Altogether, using the simple means disclosed above, it is possible to create both desired direction-dependent stiffness of the motor vehicle body lock and a reduction of the noise associated with the opening bang.

In accordance with the basic principle, it is possible for the abovementioned stiffness in a transition region from the first striker plate section to the second striker plate section to be attained by means of a separate additional means which connects said two striker plate sections to one another and which has a desired stiffness. The first striker plate section and the second striker plate section are however advantageously formed as a single piece, wherein the desired stiffness is attained by means of a suitable combination of the geometry of the transition region of the two striker plate sections and the material thereof, which is preferably a spring steel. In accordance with the basic principle, the relative arrangement of the two striker plate sections with respect to one another is likewise freely selectable. It may however advantageously be provided that the first striker plate section and the second striker plate section are oriented as mutually substantially parallel limbs of the U.

According to an embodiment, the striker has a first striker limb arranged on the second striker plate section and has a second striker limb which is spaced apart from said first striker limb, to which striker limb(s) the at least one additional mass is fastened. In this way, an easily realized mechanical coupling of the striker to the second striker plate is advantageously created. Furthermore, in this way, it is advantageously possible for the lock striker according to the embodiments of the invention to be easily produced inexpensively on a mass scale but in an individualized manner: whereas the two striker plates are manufactured in similar or even identical form in large unit quantities, an individualization of the lock striker is realized by way of specific damping means and/or additional masses. In other words, a mass-produced series of lock strikers according to the embodiments of the invention can, with a large number of similar or identical striker plates, be adapted to a particular intended use or location of use through suitable selection of strikers equipped with additional masses.

This applies all the more if the first striker limb and the second striker limb are oriented parallel to one another and symmetrically with respect to a respective edge section of the second striker plate section, and the striker section projects orthogonally with respect to said striker limbs.

Particularly preferably, an additional mass is arranged on each striker limb, which additional masses are likewise oriented symmetrically with respect to one another.

It is advantageously made possible for the additional mass to be mounted particularly easily on the lock striker according to the embodiments of the invention if said additional mass has a surface which is congruent with respect to the surface of the second striker plate section or striker limb that accommodates said additional mass.

According to an embodiment, it may be provided that the first striker plate section has a first extreme end and, spaced apart from the latter, a second extreme end, on which extreme ends there is received a spring means. The spring means is operatively connected by way of a connecting section to the second striker plate section. Consequently, the first striker plate section and the second striker plate section are elastically connected to one another by the spring means.

The desired mechanical action of the lock striker according to the embodiments of the invention is advantageously further improved in that the connecting section is received in a receptacle situated on the second striker plate section, wherein a damping means, particularly preferably a damping means manufactured from a plastic, in particular from a polymer, is situated on the connecting section and/or the receptacle. The above-discussed individualization or adaptation, in a mass production context, of the lock striker according to the embodiments of the invention can furthermore be further simplified or implemented through suitable selection of a damping means.

A lock striker which is particularly easy and inexpensive to produce is advantageously created if the spring means is formed in the manner of a cantilever. The above-discussed individualization or adaptation, in a mass production context, of the lock striker according to the embodiments of the invention is further simplified through suitable selection of the spring means material and the geometry thereof.

According to an embodiment, the spring means has a first end section and a second end section, wherein the first end section is fastened by a first end section receiving means and the second end section is fastened by a second end section receiving means to the first extreme end and to the second extreme end respectively. In this way, an easily configured fastening of the spring means is advantageously created, the stiffness of which can be easily further adapted by selection of a desired first end section receiving means and/or second end section receiving means.

According to an embodiment, the striker has a first striker limb and, parallel to the latter, a second striker limb, which striker limbs are oriented symmetrically with respect to one another and with respect to a respective edge section of the second striker plate section, wherein the striker section projects orthogonally with respect to said striker limbs. Particularly straightforward installation of the striker on the second striker plate section is made possible in this way.

The object stated further above is likewise achieved by means of a motor vehicle body lock which has a lock striker of the abovementioned type. The advantages presented above apply appropriately.

The object stated further above is likewise achieved by means of a motor vehicle which has at least one motor vehicle body lock of the type disclosed above. The advantages presented above apply appropriately.

Other objects, advantages and novel features of the embodiments of the present invention will become apparent from the following detailed description of one or more preferred embodiments when considered in conjunction with the accompanying drawing.

BRIEF DESCRIPTION OF THE DRAWING

Figure is a simplified perspective view of a motor vehicle body lock 5 which is installed on a symbolically illustrated motor vehicle 1 and which has a lock striker 10.

DETAILED DESCRIPTION OF THE DRAWING

The motor vehicle body lock 10 of this exemplary embodiment is fastened by means of screws (not shown here) to a partially shown body component 15 formed as a metal sheet, for example of a front hood, and serves for the connection of a hook 20, which is illustrated merely symbolically here.

For this purpose, the motor vehicle body lock 10 has a striker plate 25 which comprises a first striker plate section 25-1, which is adjacent to the body component 15, and a second striker plate section 25-2, which is substantially parallel to said first striker plate section. The first striker plate section 25-1 and the second striker plate section 25-2 are connected to one another at a connecting section 25-3 such that, as seen in side view, they form a U-shaped configuration. Between said first striker plate section and second striker plate section, there is formed a receiving space 30 in which a very soft damping means 32, which is under preload, is at least partially arranged.

The motor vehicle body lock 10 furthermore has a striker 40 with a first striker limb 40-1, a second striker limb 40-2 parallel to said first striker limb, and a striker section 40-3, on which the hook 20 engages and exerts a load F when the motor vehicle body lock 10 is closed. The first striker limb 40-1 and the second striker limb 40-2 are oriented symmetrically with respect to one another and with respect to a respective edge section 45 of the second striker plate section 25-2 (cf. plane of symmetry S). The striker section 40-3 projects substantially orthogonally with respect to said striker limbs and with respect to the second striker plate section 25-2.

A first additional mass 47-1 is fastened to the first striker limb 40-1 and a second additional mass 47-2 is fastened to the second striker limb 40-2. The two additional masses 47-1, 47-2 of the exemplary embodiment shown are of identical form both with regard to their mass and with regard to their configuration. They each have a foot, the surface of which is formed so as to be congruent with the surface of the first striker limb 40-1 or 40-2 respectively. The additional masses 47-1, 47-2 are also arranged symmetrically with respect to the plane of symmetry S.

The first striker plate section 25-1 comprises a first extreme end 50-1 and, spaced apart from the latter, a second extreme end 50-2, which extreme ends project in each case substantially orthogonally with respect to the former in the same direction as the striker section 40-3. In each case one first end section damping means and second end section damping means (not shown here) may be fastened to the extreme ends 50-1 and 50-2 respectively. The first end section damping means and the second end section damping means are produced from an elastic plastic or rubber and support in each case one first end section of a spring means (not shown) which is formed in the manner of a cantilever and which is manufactured from a spring steel. The spring means has, in its central region, a damping means (not shown here) which is formed from a plastic or rubber and which is received under preload in a connecting section 60 situated on the second striker plate section 25-2; the connecting section 60 is consequently formed as a receptacle 65. Those ends of the first striker plate section 25-1 and of the second striker plate section 25-2 which are remote from the connecting section 25-3 are elastically operatively connected to one another by means of said connecting section.

A desired vibrational characteristic of the motor vehicle body lock 5 according to the embodiments of the invention can advantageously be easily generated through suitable selection of the materials and geometry of the above-described elements, in particular of the dimensions thereof.

LIST OF REFERENCE DESIGNATIONS

1 Motor vehicle
5 Motor vehicle body lock
10 Lock striker
15 Body component
20 Hook
25 Striker plate
25-1 First striker plate section
25-2 Second striker plate section
25-3 Connecting section
30 Receiving space
32 Damping means
40 Striker
40-1 First striker limb
40-2 Second striker limb
40-3 Striker section
45 Edge section
47-1 Additional mass
47-2 Additional mass
50-1 First extreme end
50-2 Second extreme end
60 Connecting section
65 Receptacle
F Load
S Plane of symmetry

What is claimed is:

1. A lock striker of a motor vehicle body lock, comprising:
a striker that is arranged on a striker plate, the striker having a striker section which is configured to admit a load; and
at least one additional mass, wherein
the striker plate has a first striker plate section which is configured to be connected to a body component, and a second striker plate section on which the striker is arranged,
the first striker plate section and the second striker plate section are portions of a one-piece striker plate, wherein the first striker plate and the second striker plate are connected via a transition region of the one-piece striker plate, the transition region being located at an extreme end of the striker plate opposite the striker section,
the first striker plate section and the second striker plate section are spaced apart from one another so as to form a receiving space in which a damping means is situated, and
the at least one additional mass is arranged on the second striker plate section and on that region of the striker which is adjacent to said second striker plate section.

2. The lock striker according to claim 1, wherein the first striker plate section and the second striker plate section form the limbs of a U shape or of a V shape of the one-piece striker plate, wherein the transition region forms the closed end of the U shape or the V shape.

3. The lock striker according to claim 2, wherein the striker has a first striker limb and, parallel to the first striker limb, a second striker limb, which first and second striker limbs are oriented symmetrically with respect to one another and, and wherein the first striker limb and the second striker limb extend in a direction generally parallel to the second striker plate section.

4. The lock striker according to claim 3, wherein the at least one additional mass is positioned on the first striker limb and the second striker limb extending in the direction generally parallel to the second striker plate section, the at least one additional mass having a surface which is congruent with respect to a surface of the second striker plate section and the first or second striker limb that accommodates said additional mass.

5. The lock striker according to claim 1, wherein the damping means is located in the receiving space between the transition region and the striker section.

6. The lock striker according to claim 1, wherein the transition region comprises a bending point about which the second striker plate bends in response to the load to the striker section.

7. A motor vehicle body lock, having the lock striker according to claim 1.

8. A motor vehicle, having at least one motor vehicle body lock including the lock striker according to claim 1.

* * * * *